INVENTORS
ISOE TAKEZAWA, TOMISABURO KUMOSE,
ISHIZO TAKIZAWA, NORICHIKA KAJIHARA
BY McGlew and Toren
ATTORNEYS

United States Patent Office 3,370,565
Patented Feb. 27, 1968

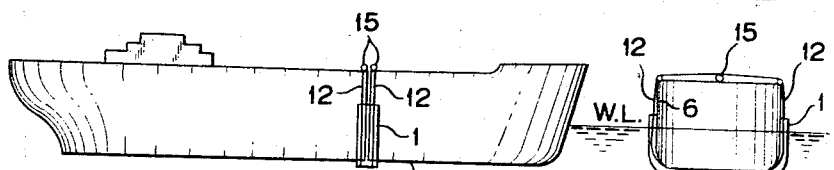
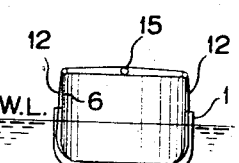
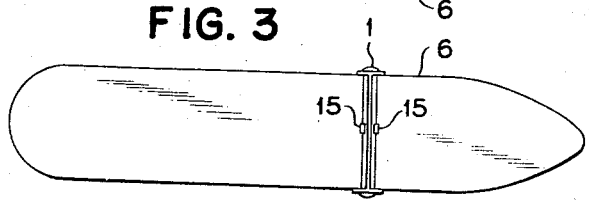
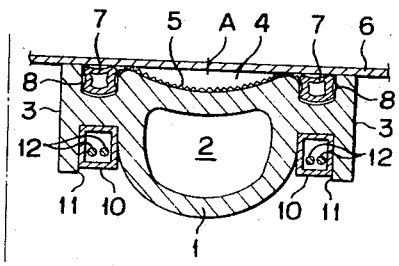
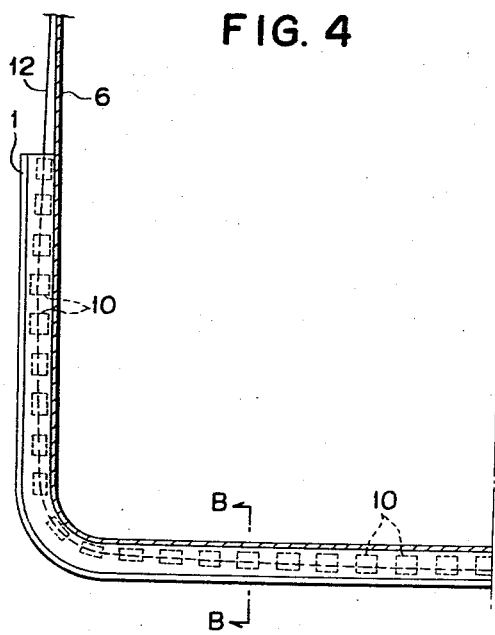
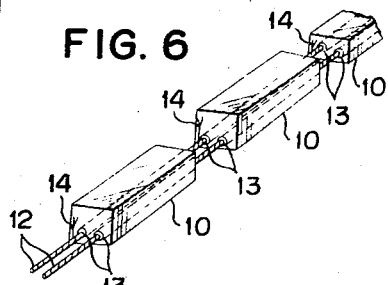
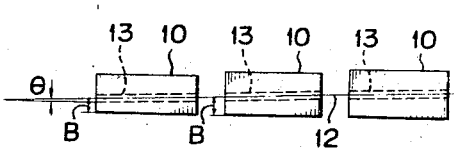

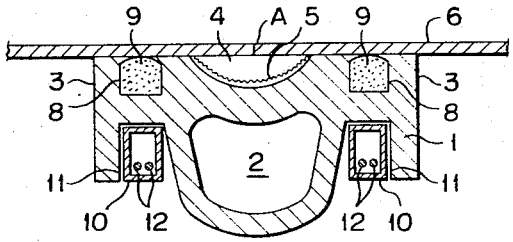
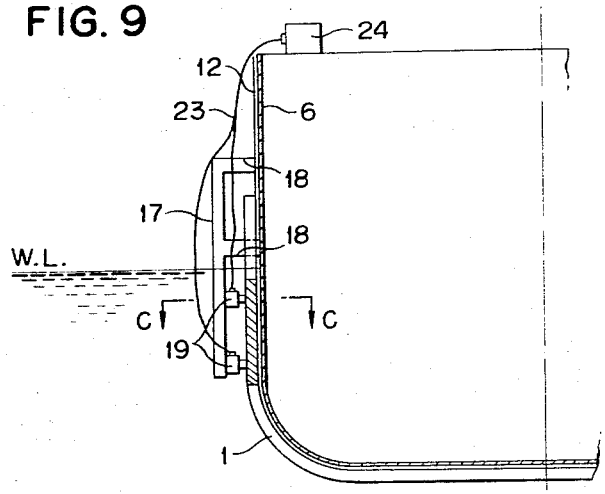
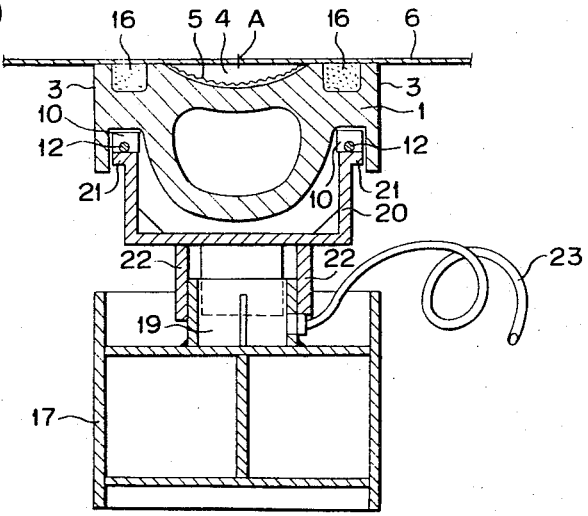

3,370,565
METHOD AND AN APPARATUS FOR FIXING A WATERPROOF BAND IN ORDER TO CUT OR JOIN A STRUCTURE FLOATING ON THE WATER
Isoe Takezawa, Tokyo, and Tomisaburo Kumose, Ichizo Takizawa and Norichika Kajihara, Kanagawa-ken, Japan, assignors to Mitsubishi Jukogyo Kabushiki Kaisha, Tokyo, Japan
Filed Jan. 11, 1967, Ser. No. 608,576
Claims priority, application Japan, July 29, 1966, 41/49,833
18 Claims. (Cl. 114—77)

ABSTRACT OF THE DISCLOSURE

A method of affixing a waterproofed band over a portion of a hull of a vessel which is floating in the water is described herein together with various embodiments of devices for providing the waterproof encircling band for performing operations on the hull of a vessel such as a ship below the waterline. With the device of the invention it is possible to weld through or cut through the vessel hull either completely around the vessel or only in a partial area below water level by using a waterproof encircling band.

---

In accordance with the method of the invention, an encircling band is directed over an area of the ship to be worked upon and it is held securely to the vessel by passing encircling securing elements such as ropes or cables around the securing band on each side of a central work area and tightening the ropes to hold the band close to the vessel in sealing engagement therewith. Additional sealing is effected by directing under fluid pressure a sealing material into grooves disposed on the band on each side of the central work area to initially position the band in respect to the vessel, the band is advantageously weighted such as by filling it with sea water. The sealing for the band on each side thereof may also be accomplished by using an inflatable tool which is carried in a groove at each side of the band and which may be inflated against the sides of the vessel or filled with a sealing material in order to provide a pressure sealing engagement with the vessel. The central work area is then drained of water by making borings inside the hull to remove any moisture that may be present.

In accordance with the preferred apparatus, the encircling band includes a band member having flanges on each side and a concave central work area between the bands which is adapted to be centered over the line of cutting or welding which is to be accomplished on the hull. The band advantageously includes a groove on each side of the central work area on the interior face which may be filled with a sealing material after the band is tightly positioned against the hull. The grooves may carry hose members instead which may be inflated to cause sealing engagement with the hull surface. The band also includes outer groove areas for accommodating cables or securing elements which may be directed through suitable enclosures or guides such as a lightweight steel tube held in the grooves. The ropes or securing cables are oriented in respect to block elements to ensure that they may be evenly tensioned around the hull structure in a manner to cause the sides of the band to be firmly pressed against the hull. In the preferred arrangement, the encircling band includes a hollow central space which may be filled with sea water in order to initially weight the band so that it may be easily directed down into the water around the hull as necessary. After the band is positioned to overlie the area to be operated upon, the central enclosed area is pumped free of sea water so that it will flow upwardly and cause the band to be moved adjacent the hull of the ship to which it is subsequently tightly secured and sealed.

In accordance with another embodiment of the invention, the encircling band includes apparatus for applying pressure to the band on each side of the central work area to force it into watertight engagement with the hull. Such means may comprise a plurality of fluid piston ram members which are directed against the encircling band at spaced locations or it may comprise a lever system in accordance with another embodiment.

In a still further embodiment of the invention, the encircling band includes a hollow space on each side instead of a groove for receiving a sealing fluid or a sealing compound, and this space is advantageously either inflated or evacuated to provide a sealing barrier on each side of the central work area. In this construction, means are provided for sealing this void space or inflatable space on each side thereof and for tightly holding the encircling band to the hull on each side thereof. In addition, in this embodiment there are two areas which may be filled with sea water for the purpose of weighting the band in order to permit its orientation in respect to the hull. Spacer elements are advantageously provided in the central area between the inner face of the band and the hull in order to provide the desired spacing therebetween which will be maintained water-free during the welding or cutting operation.

Summary of the invention

The present invention relates to a method and an apparatus for fixing a waterproof band in order to cut or join a structure floating on the water.

Recently constructed ships have rapidly increased in largeness because of great profit as well as thanks to the progress in the shipbuilding technique. This has required that the hull of an existing ship be rebuilt so as to increase in largeness. On the other hand, building berths and docks now in use scarcely have a capacity for the construction of a huge ship or for the rebuilding of a ship for the increase in tonnage. Accordingly, various methods of dividing the hull of a ship afloat and those of joining the divided parts afloat of the hull have been proposed.

Among technical difficulties incidental to the dividing or the joining of a structure afloat such as the hull of a ship, the most difficult problem is how to perform a cutting or a joining operation which is safe, simple and reliable and in which the underwater part of a cutting or a joining portion is to be kept watertight. As a waterproof body watertightly covering the cutting or the joining portion for instance, a hollow U-shaped box or a hollow L-shaped box or a bellows-type box whose cross-section is U-shaped or hoop-shaped has been proposed. Because these boxes have to be constructed to be floatable at a given height above the water level, the construction cost becomes remarkably high and the operation becomes more complicated. Indeed, the bellows-type box is well known, but really there are technical difficulties in a manner in which the box is fixed to the underwater part of a structure afloat such as a ship. It is also difficult to keep the fixed bellows-type box watertight. In the case of the most usual fixing of the bellows-type box, it is necessary to provide a large number of stud bolts on the shell plate of the hull by underwater welding. Further, in order to keep said box watertight, these bolts have to be, at a small pitch, studded at proper positions in the water. This is a very difficult operation and therefore the tightness obtained perhaps unreliable. Furthermore, the stud bolts have to be removed by underwater cutting or the like after the hull cutting or the hull joining operations. Thus, longer period and more cost are needed for such operation, while its safety still looks doubtful.

Accordingly, an object of the present invention is to overcome difficulties to which reference has been made.

Another object of the invention is to provide a new method and a new apparatus for fixing a waterproof band to divide a structure afloat such as a ship into a proper number of parts or to join together the divided parts afloat of the structure, which is divided or joined after the discharge of water from the dividing or the joining portion of the shell plate of the structure, said discharge being performed by watertightly covering the underwater part of said portion with the flexible waterproof band made of rubber or of a plastic substance, characterized in that ropes are stretched around the waterproof band and are then tightened so that said band may be pressed against the shell plate of the structure.

Furthermore, in accordance with the present invention, the waterproof band should very easily and watertightly be secured to the underwater part of the dividing or the joining portion of a structure afloat such as a ship. For this purpose according to the present invention, a watertight element is provided on the contact surface between the waterproof band and the shell plate of the structure, said watertight element being in cooperation with ropes with which the waterproof band is pressed against the underwater part of said shell plate of the structure afloat.

For an understanding of the principles of the invention, reference is made to the following description of typical embodiments thereof as illustrated in the accompanying drawings, wherein:

FIG. 1 is a side view of the hull of a ship, a structure floating on the water, showing a waterproof band, according to the invention, fastened with ropes to the underwater cutting or joining portion of the structure;

FIG. 2 is a cross-sectional view of the hull shown in FIG. 1;

FIG. 3 is a plan view of the hull shown in FIG. 1;

FIG. 4 is an enlarged partial view of the hull shown in FIG. 2;

FIG. 5 is an enlarged sectional view taken along the line B—B of FIG. 4, showing hollow rubber packings, into which fluid under pressure is injected and which cooperate with tightened ropes in keeping watertight;

FIG. 6 is a view, in perspective, of members for guiding ropes;

FIG. 7 is a view showing the inclination of each rope guided by said members;

FIG. 8 is a view similar to FIG. 5 but showing the second embodiment of the invention in which a foaming synthetic resin cooperating with tightened ropes in keeping the portions between a waterproof band and the shell plate of the hull of a ship watertight is injected into recessed grooves on said portions;

FIG. 9 is a cross-sectional view of the hull provided with hydraulic pressure means at a location corresponding to the cutting or the joining portion of the shell plate to which a waterproof band is fastened with ropes;

FIG. 10 is an enlarged sectional view taken along the line C—C of FIG. 9;

It is to be noted that the same reference numeral in the drawings is put to the same part. Especially, for an understanding of fundamental principles of the invention, the general description thereof will be given.

Figure 11:
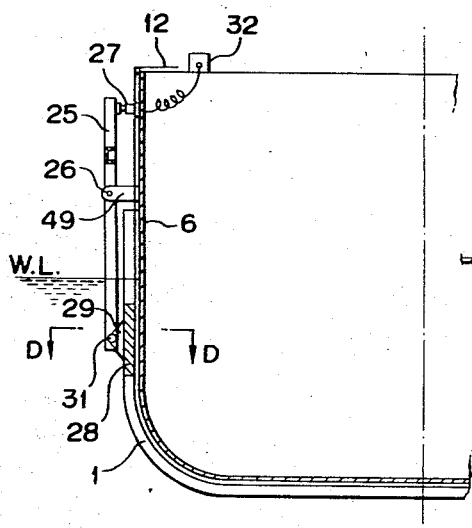
FIG. 11 is a cross-sectional view of the hull, showing the third embodiment of the invention, in which lever means, in place of said hydraulic pressure means shown in FIG. 9, is provided in the vertical direction on the shell plate of the hull and is operated by means of fluid under pressure.

Referring to FIGS. 1 to 8, a waterproof band 1 made of rubber, plastic material, etc. is proof against water pressure and is flexible. The cross-section of the band is of the shape of a semicircle (or a box) having a hollow part 2 and is, at both ends, formed with flange-shaped, watertightly holding parts 3. Furthermore, a working space 4 is provided centrally of the inside of the waterproof band, which is lined with a refractory material 5 such as asbestos. The refractory material 5 protects the waterproof band from heat due to cutting or welding, while the working space 4 serves to vent gas produced thereby. The mark A shows a cutting or a joining portion.

The inside surface of each of said parts 3 is closely opposite to the shell plate 6 of the hull and has to be proof against water pressure. In order to keep said surface watertight, a watertight element is provided between said surface and the shell plate. For instance, a hollow rubber packing 7, as such element, is inserted into a recessed longitudinal groove 8 provided on said surface after the fixing of the waterproof band to the outside of the hull. Furthermore, fluid under the pressure is injected into the hollow part of the packing 7, said hollow part being in some cases filled with a foaming synthetic resin or a waterproof putty. These measures, along with tightening the ropes, serve to keep the contact surface of the packing watertight. On the other hand, said parts 3 are, outside thereof, provided with fitting grooves 11 respectively, said grooves serving to keep said surface watertight and also to fix the waterproof band to the hull firmly. In the grooves 11 rope-guide members 10 are fitted, which guide ropes 12 and serve to press the waterproof band 1 against the underwater part of the shell plate.

Each of guide members 10 is the shape of hollow, closely sealed square prism and is almost as wide as the groove 11. Pipes 13 through which ropes 12 are passing are longitudinally fitted into each member 10, whose fitting holes are sealed so as not to admit water into the guide member. In the illustrated example, two pipes are provided.

In fitting the pipes 13 into the guide member 10, they are inclined at an angle ($\theta$), as shown in FIG. 7, and therefore ropes are guided at the angle in order that pressing forces may be applied to the shell plate of the horizontal bottom of a ship as well as to that of the vertical sides thereof. In other words, each fitting hole of each guide member is at such a distance (B) from the bottom thereof that the rope is stretched in the shape of a bow (as shown in FIG. 4) around the side and also the bottom of the ship. Thereby, a uniform pressing force is to be applied to the watertightly holding part 3 and therefore better contact between said part and the shell plate is obtained.

In order to adjust the number of rope-guide members 10 according to the largeness of the hull of a ship to be constructed and in order to mount said members at a fixed distance from one another on the rope, wires 14 are provided, serving to control the shifting of each member 10.

Rope fastening means 15 is shown in FIG. 3; as said means, a hydraulic pressure cylinder or a winch or a tackle is used.

In the above embodiment, light and durable guide members 10 made of steel are used. Needless to say, rope-guide members made of hard rubber may also be used. In this case, the thickness of each of rubber guide members is kept constant, but by inserting spacers the distance from the shell plate to each member may be changed. Furthermore, in modified example, the rope may be tightened in the shape of a bow by providing, in the fitting groove 11, wedge-type plates different in thickness and connected with one another. Thereby, a component of the tension of the rope is applied to the shell plate of the hull and therefore this is good for keeping watertight.

The hollow rubber packing 7 is provided, on the watertightly holding part 3, between the waterproof band and the shell plate, as shown in FIG. 5. The use of the rubber packing for keeping watertight is easy and very effective and is reliable because the surface of the shell plate is not very undulating. The hollow packing 7 can expand provided that fluid under pressure conveyed from a not shown high-pressure fluid source is injected into the hollow part of the packing. Thereby, the packing under the pressing force of the rope 12 is fastened to the shell plate 6 and also the watertightly holding part 3. It is therefore surely attained to keep said part watertight.

Instead of the hollow rubber packing a waterproof putty or a foaming synthetic resin 9 may be used for filling the recessed groove 8.

A waterproof putty or a foaming synthetic resin, as a watertight element, is more adaptable to any undulating surface of the shell plate than the hollow rubber packing as mentioned above.

If the waterproof putty or the foaming synthetic resin just stated is used, then even the vertical portions of the sides of a ship can surely be kept watertight in an easy and fast manner. In this case, the waterproof band 1 is fixed to the underwater part of the hull through rope-guide members 10 and is kept watertight by tightening the ropes. Water is then discharged from each recessed groove 8, in which a partition plate is provided, for instance, in the middle of the bottom of the ship. On both sides of the partition plate injection pipes are inserted into the groove 8 respectively and, as they are slowly pulled up, the above-mentioned watertight element is forced into the groove by means of pumps. By a band-floating force due to the pressure of injection and by a pressing action of ropes on horizontal and vertical portions of the hull, the watertight element is made to adhere to the surface of the shell plate, as shown in FIG. 8, and is further solidified to form a completely watertight body. After the cutting operation or the joining one, the watertight formation is removed together with the waterproof band by divers.

The waterproof band is provided with the hollow part 2, which is filled with sea water to become heavier in fixing the band to the underwater part of a floating structure. To the contrary, sea water is discharged from the hollow part 2 which has to be floatable in removing the waterproof band from the underwater part. Provided that the floating structure is a smaller one, or in some fixing manners, it is not always necessary to provide the hollow part 2.

It is to be noted that the waterproof band is, inside thereof, provided with a plurality of wire ribs as reinforcements so as to be fully proof against water pressure.

In the above embodiments of the invention, to which reference has been made in order to understand fundamental principles thereof, the watertight element is provided between the contact surface of the watertightly holding part 3 of the waterproof band 1 and that of the shell plate of the floating structure. The rope, whose tension is partly directed to the shell plate, cooperates with the watertight element in effectively keeping watertight. In a usual ship, the cross-section in the middle hull part is approximately the shape of a box and therefore it is easy to fix the waterproof band tightly to the bottom of the ship, provided that the band is given buoyancy in some ways. It, however, is very difficult to have buoyancy applied to the vertical portion of the shell plate of the hull of the ship. Especially, in the case of the longer vertical portion, in which the elongation of the rope is to be considered, it may be impossible to keep watertight only by means of the tension thereof alone.

Accordingly, in cases in which it is necessary to keep the vertical portion of the shell plate of the underwater hull part watertight surely, the corresponding part of a waterproof band has to be pressed against the vertical portion by the use of suitable means.

An embodiment showing means for use in these cases is illustrated in FIGS. 9 and 10, in which a watertight element 16 such as hollow rubber packing, a waterproof putty, etc. is provided on a watertightly holding part 3 of a waterproof band 1. A rope 12 is stretched along each part 3 on each side of the band 1. A supporting piece 17 is designed so as to press the waterproof band 1 against the shell plate of the side of a ship, the legs 18 of said piece being welded to the shell plate 6. A plurality of hydraulic pressure means 19 are provided inside the supporting piece 17, each means consisting of a cylinder and a ram. Legs 21 of a pressing piece 20, whose cross-section is the shape of a box, serve to press the watertightly holding part 3 against the shell plate 6. The pressing piece is provided in the longitudinal direction on the waterproof band. The hydraulic pressure means 19 is guided by frames 22. One end of a pressure hose 23 is connected with the pressure means 19, while the other end is connected with a pressure pump 24 inside the hull. After the fastening of the waterproof band with the rope to the shell plate of the hull, fluid under pressure is fed by the pump 24 through the pressure hose 23 to the pressure means 19, which serves to apply pressure to the watertightly holding part 3 through the pressing piece 20. Thereby, said part 3 is pressed against the shell plate of the hull, being surely kept watertight.

Figure 12:
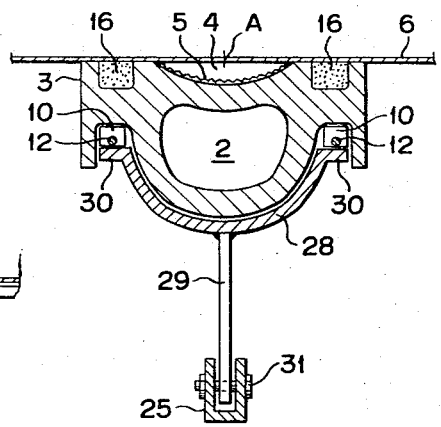
FIG. 12 is an enlarged sectional view taken along the line D—D of FIG. 11.

In the embodiment illustrated in FIGS. 11 and 12, lever means is used in place of the above-mentioned hydraulic pressure means directly applying pressure to the watertightly holding part. The lever means 25 is designed so as to press a waterproof band 1 fixed to the shell plate 6 of the hull of a ship, a supporting leg 33 of said means being welded to the shell plate through a pin 26. Pressure responding means 27 such as a ram is provided on the shell plate in such a way that the point of the application of force of the means 27 is on the upper end of the lever means 25 extending in the vertical direction. Legs 30 of a pressing piece 28, which is fixed to the lower end of the lever means 25 through a supporting piece 29, serve to press the watertightly holding part 3 against the shell plate 6. The pressing piece 28 is arranged in the longitudinal direction of the waterproof band. The supporting piece 29 is connected with the lever means 25 through a pin 31. A pressure pump 32, which supplied the means 27 with fluid under pressure, is provided on the upside of the hull. The fore caused by the means 27 works the lever means 25, whose supporting point is the pin 26. Thereby, the lower end of the lever means is shifted towards the shell plate to push the pressing piece 28 through the supporting piece 29. Pressure is thus applied to the watertightly holding part 3 by the pressing piece 28.

Figure 13:
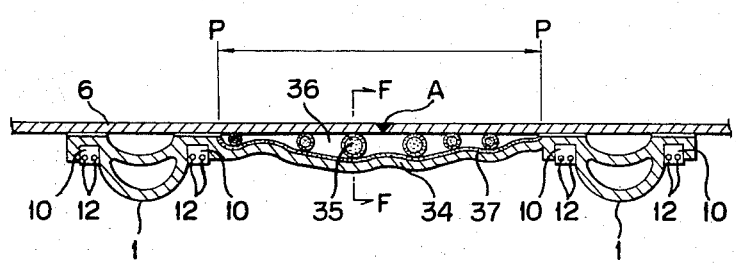
FIG. 13 is a cross-sectional view showing the fifth embodiment of the invention, in which a waterproof band is, on both ends of a flexible waterproof screen, fixed to the shell plate of the hull.
Figure 14:
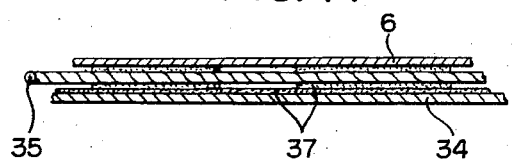
FIG. 14 is a sectional view taken along the line F—F of FIG. 13.

Referring to FIGS. 13 and 14, in which a modified waterproof band is shown, a flexible waterproof screen 34 made of, for instance, rubber, plastic material, sheet steel, etc. is provided between waterproof bands 1, 1', which are similar to those shown in the foregoing drawings, so as to be united therewith as one body covering the shell plate of the hull of a ship. The space 36 between the waterproof screen 34 and the shell plate is obtained by inserting suitable distance pieces 35, each of which consists of, for instance, a core of wire and parts of asbestos mounted equidistantly on the wire in order to protect the wire from heat caused by welding. The diameter of each wire is predetermined so that the distance, in the middle of the space 36, from the shell plate to the screen may be largest. A heat insulator 37 is provided inside the waterproof screen 34. In the example shown, two waterproof bands 1, 1' are fastened to the shell plate with ropes, as already mentioned, and water is then discharged from the space 36, where requisite works are performed.

Furthermore, the waterproof screen 34 may widely be mounted, as shown by the line P—P of FIG. 13. Accordingly, in joining the divided hull parts, especially in providing, between these parts, a middle hull part separately built and in welding together on the water, the repair work can, more widely along the joining line, be performed so that the abutting surfaces of the hull part, even different in shape, may be engaged. In this case, in order to prevent the waterproof band from being abnormally stressed, the flexible screen 34 is needed. The discharge of water from the space 36 is smoothly and rapidly performed because the parts of asbestos of each distance piece 35 are mounted on the wire thereof at a distance from one another.

It is to be understood that the present invention should not be limited to the illustrated embodiments and that various modifications thereof may be made without departing from the spirit and scope of the invention.

A general description of the fulfilment of the present invention will be given below with reference to FIGS. 1 to 7.

First, rope-guide members 10 beforehand mounted on ropes 12 are fitted in grooves 11 of the waterproof band 1 respectively, while a watertight element such as a hollow rubber packing 7 is inserted into the groove 8 provided on the surface of each of watertightly holding parts 3. Negative pressure is kept prevailing in the hollow part of the rubber packing. The hollow part 2 of the waterproof band prepared, as stated above, on a ship afloat is now filled with water. Thereby, the waterproof band increases weight and therefore is hung by ropes 12 so as to be carried in the water to the cutting or the joining portion of the hull is a suitable way, for instance, by using a floating crane. Water is then discharged by means of pumps from the hollow part 2 of the waterproof band now at the predetermined location. Thereby, owing to buoyancy the waterproof band 1 is abutted against the horizontal part of the bottom of the ship. Ropes 12 are then tightened by, for instance, winches 15 on the deck and therefore press the water tightly holding parts 3 through rope-guide members 10. High-pressure fluid is then injected into the hollow part of the hollow rubber packing 7 fitted on said parts 3, said hollow part being expanded to be pressed watertightly against the shell plate. A foaming synthetic resin or a waterproof putty may be used as filler instead of the hollow rubber packing.

When the waterproof band has been pressed against the shell plate to keep watertight, boring is carried out inside the hull through the shell plate in order to discharge water from the space 4 and further the gas cutting of the cutting portion or the back welding of the joining portion is carried out inside the hull.

The above-mentioned steps in the embodiments illustrated in FIGS. 1 to 7 are applicable to other embodiments of the present invention.

As is evident from the foregoing, in accordance with the present invention a simple and reliable operation can be obtained without any working of the underwater part of the hull. Furthermore, the cutting or the joining portion of the shell plate of the underwater hull part can rapidly and inexpensively be cut or joined together.

What is claimed is:

1. A method of affixing a waterproof band to the hull of a vessel when it is floating in water for the purpose of performing operations such as welding or cutting below the waterline and using a covering band having an inner face with a central work area forming portion adapted to be spaced from the hull to form a waterproof chamber around the hull and a continuous sealing groove defined inwardly from said inner face on each side of said central work area defining portion, said covering band having an outer face with a continuous securing element groove located adjacent each side of the central work area forming portion, comprising directing the band around the portion of the hull to be operated upon and centering the central work area forming portion over the area of the hull to be operated upon, directing a continuous securing element such as a rope through each securing element groove defined in the outer face of said covering band and tightening the securing element to press the sides of the band tightly against the hull, and thereafter directing under fluid pressure a sealing medium into the sealing grooves defined on each side of the central work area defining portion to seal this portion.

2. A method according to claim 1, wherein the covering band includes a hollow cavity between the outer surface and said inner surface and comprising the further step of filling the cavity with sea water before it is directed around the portion of the hull to be operated upon in order to weight the encircling band to permit it to easily be moved through the water, and after the band is in a position in respect to the hull pumping the sea water out of the hollow space to permit the band to float upwardly adjacent the hull.

3. A method according to claim 1, including the further step of pressing the band on each side of the central area against the hull by means of additional pressing elements arranged on the exterior of said covering band.

4. A method according to claim 3, wherein said additional pressing is accomplished by fluid pressure means.

5. A method according to claim 3, wherein said additional pressing is accomplished by mechanical leverage.

6. An apparatus for waterproofing a work area around a portion of a vessel hull for the purpose of performing underwater operations on the hull such as cutting and welding, comprising a covering band having an inner surface adapted to be oriented around the portion of the hull to be operated upon with a central area being formed to define a space between said band and the hull, a continuous groove extending along the length of said band on each side of said central area adapted to be filled with a sealing material under pressure and to be forced against the surface of the hull, said band having an exterior face with a continuous groove defined along the length of the band on each side of the central work area for receiving a securing element therein which is adapted to be tightened for tightly pressing the sides of the band against the hull of the ship to seal off each side of the central working area against the penetration of water therein.

7. An apparatus according to claim 6, wherein said band includes a hollow portion defined between said inner and outer faces which is adapted to be filled with sea water for weighting the band when the band is to be directed downwardly into the water.

8. An apparatus according to claim 6, including a tube disposed in each of the grooves on said inner face, said tubes being adapted to be filled with a fluid under pressure for sealing said tubes against the hull and against said band adjacent the grooves of said band.

9. An apparatus according to claim 6, including a securing cable in each groove of said outer face of said band, and means for orienting said securing cable in a bow-shaped curved outline such that when it is tightened it will provide pressure inwardly on each side of said band around the length of the hull which is covered thereby.

10. An encircling band for providing a waterproof working area around the exterior of a hull of a vessel which is floating in water at a location below the waterline comprising a band inner face having an inwardly extending work area portion which is adapted to be positioned over the portion of the hull of a vessel which is to be operated upon, a heat insulation material disposed on said work area portion of said band, a flange portion on each side of said work area portion, said inner face having a groove in each flange portion extending continuously along the length thereof adapted to be filled with sealing means, said band having an outer face with a groove in each flange portion aligned with the groove of said flange portion of said inner face, and a tubular guide member for securing cables disposed in each of said grooves of said outer face.

11. An encircling band according to claim 10, wherein said grooves on said inner face are filled with a sealing material such as putty which is inserted under pressure.

12. An encircling band according to claim 10, including an expansible tube in each of said grooves on each side of said work area portion of said inner face.

13. An encircling band according to claim 10, including means in said guide tubes for supporting a securing cable at selected locations in respect to said guide tube and for sealing said securing cable in a watertight manner.

14. An encircling band according to claim 10, including means for applying pressure to said band on each side of said work area portion against the outer face to force said band into sealing engagement with the vessel hull.

15. An encircling band according to claim 14, wherein said means for applying pressure comprises an elongated member adapted to be secured to the side of the vessel and having a plurality of spaced fluid pressure members each including a member movable against said band under fluid pressure to force said band against the hull of said vessel.

16. An encircling band according to claim 14, wherein said means for applying pressure includes a lever member pivoted to said vessel and having its lower end connected to said band on each side of the work area portion for pressing said band against the hull of the vessel by pivotal movement of the upper end thereof.

17. An encircling band according to claim 10, including spacer elements disposed between the work area portion of said band and the hull.

18. An encircling band according to claim 10, including a hollow space defined between the inner surface of said band and the exterior surface of said band and adjacent each of said inner surface grooves.

References Cited
UNITED STATES PATENTS

| | | | |
|---|---|---|---|
| 1,306,938 | 6/1919 | Achiha | 114—229 |
| 3,183,876 | 5/1965 | Kronhaus | 114—229 |

MILTON BUCHLER, *Primary Examiner.*

T. M. BLIX, *Assistant Examiner.*